United States Patent
Burrahm (10) Patent No.: US 9,206,769 B2
(45) Date of Patent: Dec. 8, 2015

(54) INTERNAL COMBUSTION ENGINE HAVING DEDICATED EGR CYLINDER(S) WITH INTAKE SEPARATE FROM INTAKE OF MAIN CYLINDERS

(71) Applicant: Southwest Research Institute, San Antonio, TX (US)

(72) Inventor: Robert W Burrahm, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 418 days.

(21) Appl. No.: 13/741,955

(22) Filed: Jan. 15, 2013

(65) Prior Publication Data

US 2014/0196697 A1 Jul. 17, 2014

(51) Int. Cl.
*F02B 47/08* (2006.01)
*F02M 25/07* (2006.01)

(52) U.S. Cl.
CPC ......... *F02M 25/0718* (2013.01); *F02M 25/074* (2013.01); *F02M 25/0749* (2013.01); *F02M 25/0706* (2013.01); *Y02T 10/121* (2013.01)

(58) Field of Classification Search
CPC ........... F02M 25/0749; F02M 27/0707; F02D 41/0065
USPC ....... 123/58.8, 315, 568.17, 568.11; 701/108; 60/278–280, 605.1, 605.2
See application file for complete search history.

(56) References Cited

U.S. PATENT DOCUMENTS

| | | | | |
|---|---|---|---|---|
| 4,131,095 A * | 12/1978 | Ouchi | ....... | F02B 1/06 123/3 |
| 4,359,979 A * | 11/1982 | Dolza | ....... | F02D 17/02 123/195 F |
| 6,053,154 A * | 4/2000 | Pott | ....... | 123/568.11 |
| 6,742,507 B2 | 6/2004 | Keefer et al. | | |
| 7,721,541 B2 | 5/2010 | Roberts, Jr. et al. | | |
| 8,291,891 B2 | 10/2012 | Alger et al. | | |
| 2009/0308070 A1* | 12/2009 | Alger et al. | ....... | 60/602 |
| 2013/0133616 A1* | 5/2013 | Klingbeil | ....... | 123/304 |

FOREIGN PATENT DOCUMENTS

GB 2 093 909 A * 9/1982

* cited by examiner

*Primary Examiner* — Hung Q Nguyen
*Assistant Examiner* — Josh Campbell
(74) *Attorney, Agent, or Firm* — Livingston Law Firm

(57) ABSTRACT

A method and system for using an internal combustion engine with dedicated EGR cylinders to provide an adjustable EGR rate to the main (non dedicated) cylinders. The dedicated EGR cylinder(s) are configured to receive fresh air via a fresh air intake or to receive a portion of the mixture of fresh air and EGR gas via the same mixed intake line that delivers intake to the main cylinders. If the dedicated EGR cylinder(s) receive only fresh air, the main cylinder(s) receive EGR at higher EGR rate. If the dedicated EGR cylinder(s) receive only the portion of fresh air and EGR gas, the main cylinder(s) receive EGR at a lower EGR rate. The EGR rate to the main cylinder(s) may be adjusted between these rates in response to operating conditions of the engine.

18 Claims, 6 Drawing Sheets

INTERNAL COMBUSTION ENGINE HAVING DEDICATED EGR CYLINDER(S) WITH INTAKE SEPARATE FROM INTAKE OF MAIN CYLINDERS

TECHNICAL FIELD OF THE INVENTION

This invention relates to internal combustion engines, and more particularly to an exhaust gas recirculation system having one or more dedicated EGR cylinders.

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR).

To implement EGR, a fraction of the exhaust gas is recycled from the exhaust system back to the intake system. The recirculated exhaust gas is mixed with the fresh fuel-air mixture before entering the cylinders. EGR can be implemented in internal and external configurations. External configurations can be implemented as either a high pressure or low pressure loop when boosting with a turbocharger, depending on whether the recirculated exhaust is introduced to the intake post compressor (high pressure loop) or pre-compressor (low pressure loop).

EGR has a long history of use in both diesel and spark-ignited engines for reduction of NOx emissions. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine, so reducing the amount of exhaust gas produced.

As a relatively simple and low cost technology, EGR can be expected to be widely used on all types of engines. Of particular interest is that EGR can reduce the need for fuel enrichment at high loads in turbocharged engines and thereby improve fuel economy.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to systems and methods for use with an internal combustion engine having dedicated EGR. In a "dedicated EGR" engine, one or more of the engine's cylinders are used to generate exhaust gas, all of which is recirculated to the intake charge of the engine.

The dedicated EGR may be produced by a cylinder having a single exhaust port that opens only to an EGR loop. The other cylinders produce "normal" exhaust, i.e., exhaust that exits the engine via one or more exhaust aftertreatment devices. U.S. Pat. No. 8,291,891, entitled "EGR System with Dedicated EGR Cylinders", to Alger, et al., describes a system that generates dedicated EGR in this manner and is incorporated by reference herein.

Alternatively, the dedicated EGR may be produced by a cylinder having dual exhaust ports. For production of dedicated EGR, during selected engine cycles, only one of these exhaust ports is open and that port is open to the EGR loop. During other engine cycles, the other exhaust port is open and the cylinder generates "normal" exhaust. U.S. patent application Ser. No. 13/736271, entitled "EGR Rate Control for Internal Combustion Engine with Dual Exhaust-Ported Cylinders", to Gingrich, et al., discusses producing dedicated EGR in this manner and is incorporated by reference herein.

For purposes of this description, a "dedicated EGR cylinder" may be either type—a cylinder used only for the production of dedicated EGR or a cylinder used to produce dedicated EGR when its EGR exhaust port is open. In either case, at a given time, the entire output of exhaust gas of the cylinder is recirculated as EGR. "Dedicated EGR" may be produced by either type of cylinder.

A feature of dedicated EGR is that the composition of the dedicated EGR exhaust gas may be controlled to be different from that of the exhaust of the non-dedicated cylinders. For example, the dedicated EGR cylinder(s) may be run more rich to provide EGR that improves combustion on all cylinders.

Figure 1:
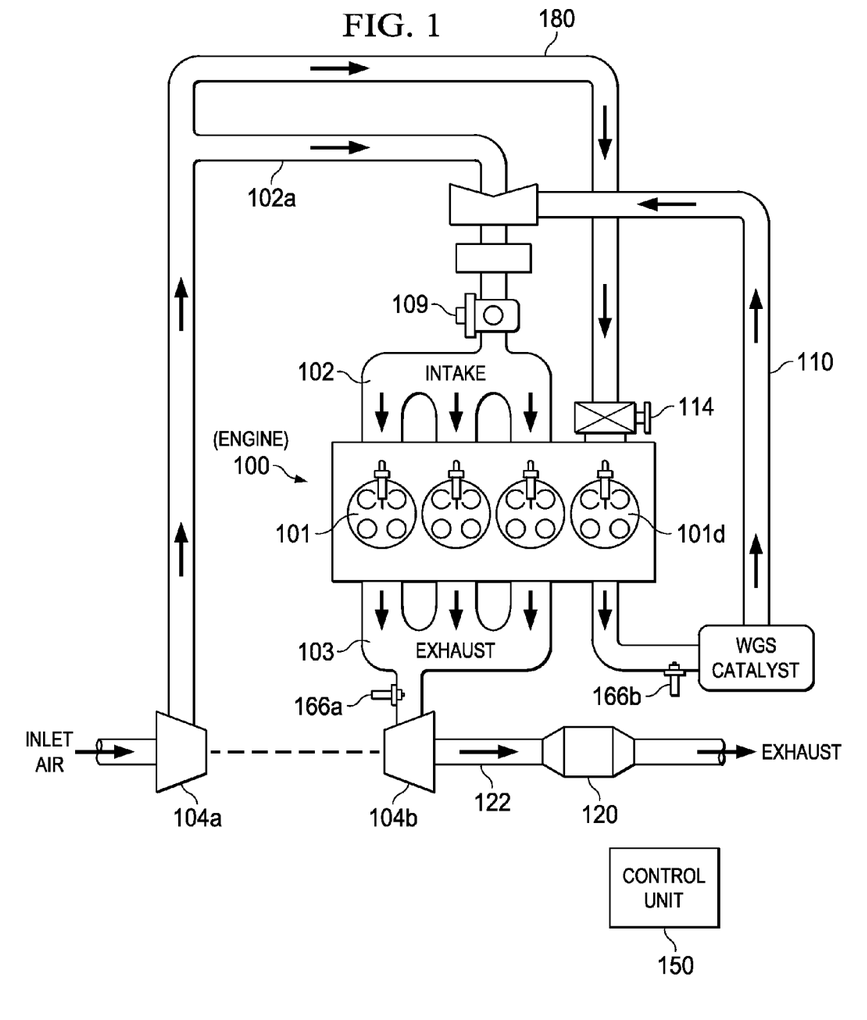
FIG. 1 illustrates an example of an internal combustion engine having a dedicated EGR cylinder and having separate undilute intake.
Figure 2:
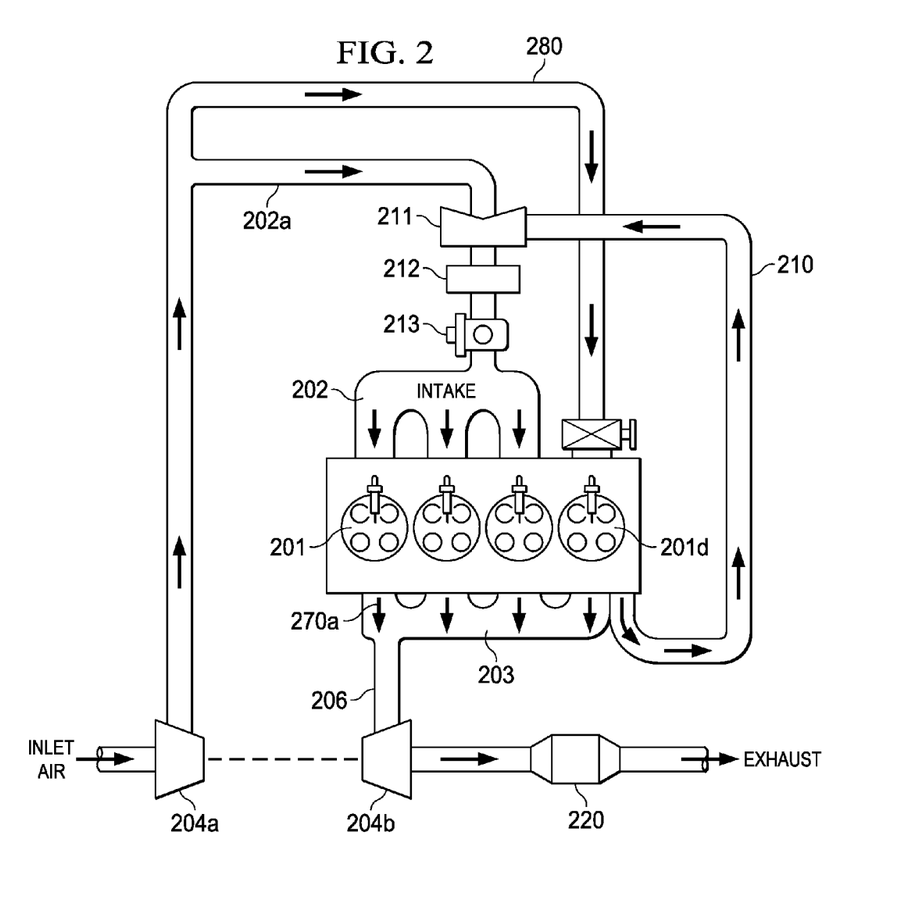
FIG. 2 illustrates an example of an internal combustion engine having a dual exhaust-ported cylinder, which generates dedicated EGR as well as normal exhaust, and having separate undiluted intake.
Figure 3:
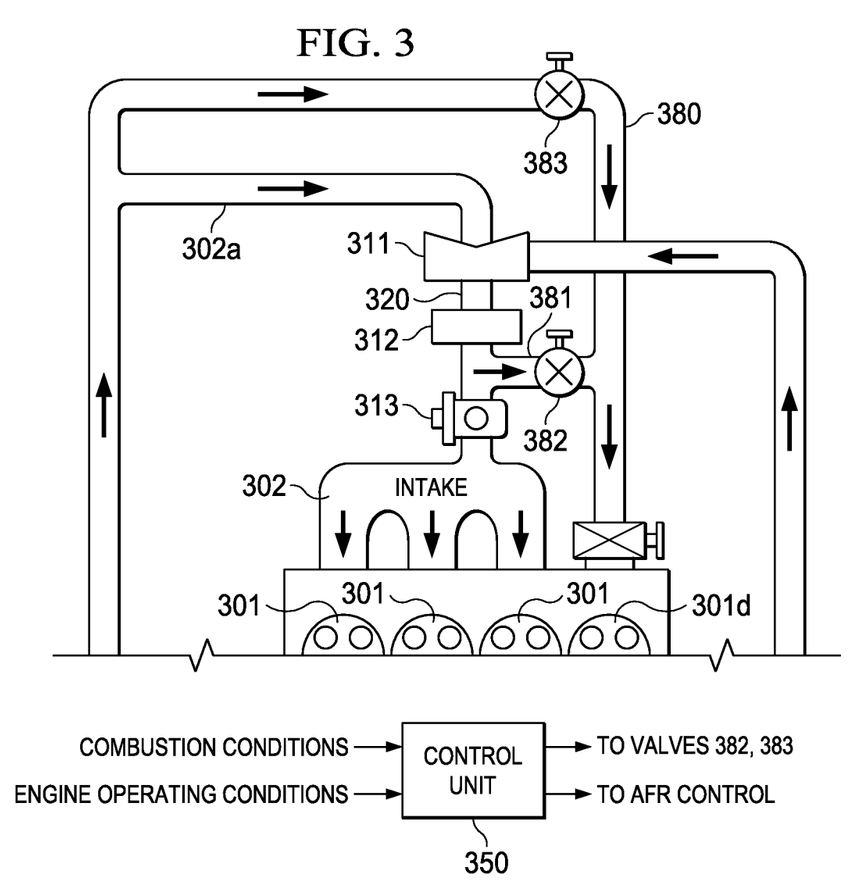
FIG. 3 illustrates an example of an internal combustion engine having a dedicated EGR cylinder and configured to receive either dilute or undiluted intake air or a mixture.

The description below is specifically directed to internal combustion engines having dedicated EGR and also configured to provide the dedicated EGR cylinder(s) with undilute (contains no EGR) intake. In the embodiments of FIGS. 1 and 2, the dedicated EGR cylinder(s) has a single undilute intake path. In the embodiment of FIG. 3, the dedicated EGR cylinder(s) has a dual intake path, such that one path delivers undilute intake and the other path delivers dilute intake.

Dedicated EGR with Single Exhaust-Ported Cylinders and Single Undilute Intake Path FIG. 1 illustrates an internal combustion engine 100 having four cylinders 101. One of the cylinders is a dedicated EGR cylinder, and is identified as cylinder 101d. In other embodiments, there may be a different number of engine cylinders 101, and/or there may be more than one dedicated EGR cylinder 101d. As stated above, in general, in a "dedicated EGR" engine configuration, all of the exhaust of a sub-group of cylinders is routed back to the engine intake.

In this embodiment, the engine's intake system has two independent intake paths. One path provides a mixture of fresh air and high quality EGR to the main cylinders. The other provides fresh air to the dedicated EGR cylinder. More specifically, the dedicated EGR cylinder 101d has its own intake path 180, which provides undiluted (contains no EGR) fresh air to the intake of the dedicated cylinder 101d.

In the example of this description, engine 100 is spark ignited, with each cylinder 101 having an associated spark plug (not shown), and its "normal" air-fuel ratio is stoichiometric. However, the methods described herein are also suitable for use with compression ignited engines. In general, the engine's non-dedicated EGR cylinders 101 can be operated with whatever air-fuel ratio is appropriate for the engine.

The dedicated EGR cylinder 101d may be operated at any desired air-fuel ratio. All of its exhaust is recirculated back to the intake manifold 102. The exhaust of the other three cylinders 101 (referred to herein as the "main" or "non dedicated" cylinders) is directed to an exhaust system via an exhaust manifold 103.

Engine 100 is equipped with a turbocharger, specifically a compressor 104a and a turbine 104b. Although not explicitly shown, the cylinders have some sort of fuel delivery system for introducing fuel into the cylinders. This main fuel delivery system can be fumigated, port injected, or direct injected.

In the example of this description, the EGR line 110 joins the intake line downstream the compressor 104a. A throttle 109 is used to control the amount of intake (fresh air and EGR) into the intake manifold 102.

A valve 114 may be used to control the intake into the EGR cylinder 101d. In other embodiments, other means, such as variable valve timing, may be used to control EGR flow.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104b, which drives compressor 104a. After turbine 104b, exhaust gas flows to an exhaust aftertreatment device 120, to be treated before exiting to the atmosphere.

Assuming engine 100 is operated stoichiometrically, the dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three way catalyst. In embodiments in which the engine system is a lean burn system, the exhaust from the non dedicated ("main") EGR cylinders will pass through an appropriate exhaust aftertreatment device, such as a lean NOx trap, NOx adsorber or selective reduction catalyst.

To control the air-fuel ratio, exhaust gas may be sampled by an exhaust gas oxygen (EGO) sensor. Both the main exhaust line 122 and the EGR loop 110 may have a sensor (identified as 166a and 166b), particularly because the dedicated EGR cylinders may be operated at a different air-fuel ratio than non dedicated cylinders.

If a dedicated EGR cylinder 101d is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as low speed and high torque, due to increased EGR tolerance and the knock resistance provided by hydrogen (H2) and carbon monoxide (CO).

In the embodiment of FIG. 1, which has four cylinders 101 with one of them being a dedicated EGR cylinder 101d, the EGR rate to the main cylinders may be as high as 33%. Exhaust from the dedicated EGR cylinder 101d is directed only to the main cylinders 101. The fresh air intake for the dedicated EGR cylinder 101d is separate from the intake of the non dedicated EGR cylinders 101. The main cylinders 101 receive all of the exhaust from the dedicated EGR cylinder 101d, while the dedicated EGR cylinder 101d receives undiluted intake air. If all of the exhaust from the dedicated EGR cylinder(s) is divided equally among the three main cylinders, the result is 33% EGR to each main cylinder.

A control unit 150 has appropriate hardware (processing and memory devices) and programming for performing the methods described herein. In addition, control unit 150 may perform other tasks, such as overall EGR control, and may be integrated with a comprehensive engine control unit.

Dedicated EGR with Dual Exhaust-Ported Cylinders and Single UnDilute Intake Path FIG. 2 illustrates one embodiment of an internal combustion engine 200 having four cylinders 201, one of which has dual exhaust ports and dual exhaust valves. As explained below, this dual exhaust ported cylinder 201d can be referred to as a "dedicated EGR cylinder" because its dual exhaust ports allow it to be operated as such.

Although the dedicated EGR cylinder 201d has its exhaust configured differently from that of the dedicated EGR cylinder of FIG. 1, its intake is the same. That is, its intake is via a fresh air intake path 280 that provides undiluted intake to the dedicated EGR cylinder.

More specifically with regard to its exhaust, the dedicated EGR cylinder 201d may be operated so that one of its exhaust valves is open to either the main exhaust line 206 or to the EGR loop 210 and the other exhaust valve is closed. The main exhaust line 206 and the EGR loop 210 are not in any fluid communication with each other, such that the dual exhaust-ported cylinder has its two exhaust ports connected to entirely separate exhaust flow paths.

The cylinder exhaust port that opens to the main exhaust line 206 is referred to herein as the "main exhaust port" 270a and has a "main exhaust valve". The cylinder exhaust port that opens to the EGR loop 210 is referred to herein as the "EGR exhaust port" and has an "EGR exhaust valve". The exhaust valves associated with each exhaust port are not explicitly shown.

In the example of this description, engine 200 is normally stoichiometrically operated and is spark ignited, each cylinder 201 having an associated spark plug 205. However, the methods described herein are also suitable for use with compression ignited engines.

The EGR cylinder's dual exhaust valves are separately controlled on a cycle-by-cycle basis. Thus, at any engine cycle, one or the other exhaust valve is open. Further, at any engine cycle, all or some or none of the EGR cylinder's EGR exhaust valves may be open to the EGR loop 210. If an EGR exhaust valve is not open to the EGR loop, its main exhaust valve is open to the main exhaust line. Thus, at any given cycle, the EGR cylinder may be operating as a "dedicated EGR cylinder" or a "main exhaust cylinder".

When operating as a main exhaust cylinder, in some embodiments, a cylinder is run stoichiometrically. In other embodiments, a main exhaust cylinder may be run lean.

When operating as a dedicated EGR cylinder, a cylinder can operate at any equivalence ratio because its exhaust will not exit the engine before passing through a cylinder acting as a main exhaust cylinder. A dedicated EGR cylinder is typically run rich to provide EGR with a composition that is beneficial to engine operation, such as by improving combustion.

Although not explicitly shown, the cylinders have some sort of means for introducing fuel into the cylinders, such as fuel injectors. The main fuel delivery system can be fumigated, port injected, or direct injected.

Engine 200 is equipped with a turbocharger, specifically a compressor 204a and a turbine 204b. The main exhaust line 206 is equipped with one or more catalytic exhaust aftertreatment devices 220. The type of aftertreatment device is appropriate for the exhaust composition. Thus, where the main exhaust cylinders are run stoichiometrically, the aftertreatment device 220 can be a three way catalyst. Where the main exhaust cylinders are run lean, the aftertreatment device 220 could be a NOx trap or NOx adsorber.

In this embodiment, the EGR line 210 joins the intake line at a mixer 211. The mixture of recirculated exhaust and fresh air is cooled with a cooler 212. A throttle 213 is used to control the amount of intake into the intake manifold 202.

Like the embodiment of FIG. 1, engine 200 is configured with separate intake paths for the main cylinders and the EGR cylinder. The main cylinders receive dilute (EGR containing) intake air. The EGR cylinder receives undiluted (fresh air only) intake air via a fresh air intake path 280 that is separate from the intake path 202a to the main cylinders.

In the embodiment of FIG. 2, which has four cylinders 201 with one of them being a dedicated EGR cylinder 201d, EGR rates of 33% are possible. The same principles of operation of the intake apply as described above in connection with FIG. 1.

Also, like the embodiment of FIG. 1, engine 200 is equipped with a control unit 250, configured and programmed similarly to the control unit illustrated in FIG. 1.

Dedicated EGR Cylinders with Dual Intake Paths

FIG. 3 illustrates a modified intake system, which may be a modification of the dedicated EGR engine of either FIG. 1 or FIG. 2. This intake system provides fresh air intake to the dedicated EGR cylinders as in the above-described embodiments, and also a portion of the mixed intake that would otherwise be delivered to the main cylinders.

In this embodiment, a passage 381 connects the mixed intake line 320 of the main cylinders 301 to the undilute intake line 380 of the dedicated EGR cylinder 301d. In the example of FIG. 3, the passage 381 communicates with the intake line 302a at a point after fresh air and EGR have mixed. In the example of FIG. 3, this point is downstream of both mixer 311 and optional intercooler 312. Passage 381 is in fluid communication with fresh air intake line 380 at any point upstream the dedicated EGR cylinder 301d.

A valve 382 in passage 381 controls flow of dilute intake through passage 381 into dedicated EGR cylinder 301d. A valve 383 in intake line 381 upstream of the junction of passage 381 controls flow of undilute (fresh air) into dedicated EGR cylinder 301d.

Valves 382 and 383 are independently controlled with control signals from control unit 350. As explained below, these valves may be open/closed type valves. Or, they may have variable openings to allow only some passage of EGR or air, respectively.

In this embodiment, the dedicated EGR cylinder 301d may operate with valve 382 closed and valve 383 open. This results in approximately 33% of the exhaust from the dedicated EGR cylinder 301d being distributed to each of the other (main) cylinders 301.

However, when valve 382 is open and valve 383 is closed, the system fully distributed EGR operation with approximately 25% of the EGR routed to each of the four cylinders. When proportional control is applied to both valve 382 and valve 383 is it possible to vary the EGR distribution to the main cylinders between 25% and 33%.

Method of Using Dedicated EGR with Dilute/Undilute Intake

Figure 4:
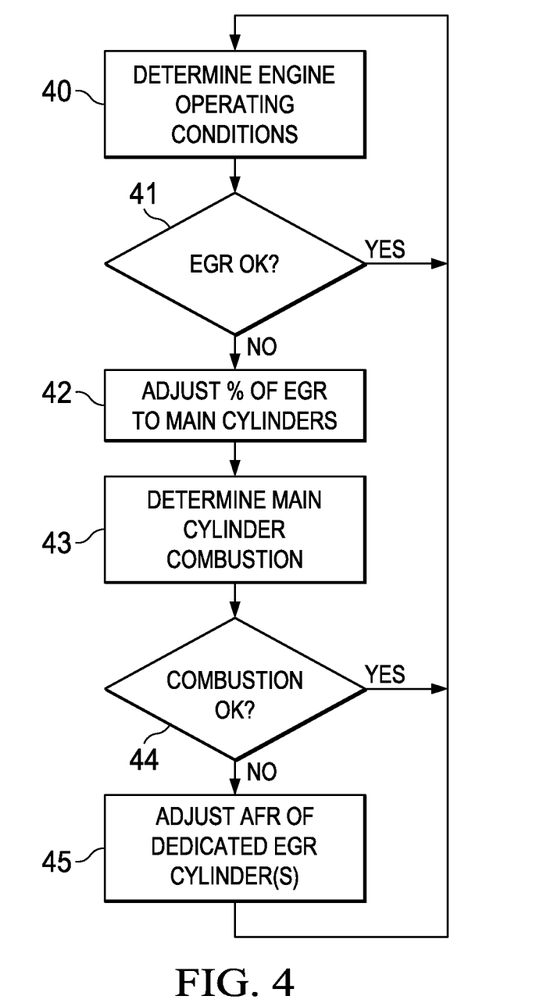
FIG. 4 illustrates a method of operating a turbocharged engine having dedicated EGR and dual intake paths as shown in FIG. 3.

FIG. 4 illustrates a method of using dedicated EGR to adjust the EGR rate into the non dedicated (main) EGR cylinders. It is assumed that the engine has one or more dedicated EGR cylinder(s), and dual intake paths to the dedicated EGR cylinder(s) as described above in connection with FIG. 3. Basically, the intake flow to the dedicated EGR cylinder is controlled in response to a desired EGR distribution between the main cylinders and the dedicated EGR cylinder(s).

The method of FIG. 4 may be performed with appropriate programming of control unit 350. Control unit 150 receives the various inputs discussed below. It processes these inputs, and delivers appropriate control signals, such as to valves 382 and 382 and to whatever processes or actuators determine the air-fuel ratio of the dedicated EGR cylinder(s).

Step 30 is determining engine operating conditions that affect the desired amount of EGR to the main cylinders. Determining the optimal level of EGR can be a function of one or more of various engine operating conditions such as speed, torque, boost pressure and EGR composition (H2 and CO), as well as fixed engine attributes such as compression ratio, peak cylinder pressure limit and boosting capability (turbocharger and/or supercharger).

Specific operating condition parameters could include engine speed, throttle position, coolant temperature, intake manifold air temperature, exhaust temperature, air-fuel ratio as determined from exhaust oxygen sensors, and knock as determined from knock detection sensors. These operating conditions may be determined directly, such as by various sensing devices, or indirectly, such as by an ignition event. As a specific example, engine coolant temperature could be sensed and used to determine a cold start condition. Additional parameters that may be used to determine desired EGR rates include those calculated or model-based from combined sensor inputs. The desired end result is typically the optimization of combustion phasing and knock avoidance to maximize fuel efficiency.

Certain operating conditions are limiting of the EGR rate. For example, EGR during a cold start can be problematic due to water condensation in the intake manifold, so less is better. Additionally, boosting limitations at low speed high torque conditions and combustion limitations at high speed high torque conditions may call for limiting EGR rates.

Control unit 350 is programmed to receive input data representing these engine conditions. Control unit 350 includes memory for storing data representing relationships between engine conditions and a desired EGR rate, so that the engine condition inputs can be used to determine a desired EGR rate output.

In Step 41, based on the input from Step 40, control unit 350 determines if an adjustment in the EGR rate is called for. As described above, using valves 382 and 383, the EGR rate to the main cylinders 301 can be varied in a range of 33% to 25% EGR to each cylinder.

In Step 42, if a change in the EGR rate is required, control unit 350 delivers appropriate control signals to valves 382 and 383.

In Step 43, control unit 350 determines combustion conditions in the main cylinders that may affect the desired composition of the EGR. Specifically, at a given EGR rate to a main cylinder, the EGR composition may be adjusted for optimum combustion. For example, although all EGR control strategies might operate the dedicated EGR cylinder rich, the particular air-fuel ratio may be different.

More specifically, to maintain high combustion efficiencies in combination with very high EGR rates in the main cylinders, increased hydrogen concentrations are necessary. This can be achieved by operating the dedicated cylinder(s) at a greater equivalence ratio. Because the dedicated EGR cylinder(s) may operate without EGR, they may receive more over-fuelling. With the increased equivalence ratio, much more hydrogen (H2) and carbon monoxide (CO) is produced in the EGR produced by the dedicated EGR cylinder(s). This leads to decreased burn durations and improved combustion in the main cylinders and results in higher engine efficiencies.

In Step 44, control unit 350 determines if a change in the air-fuel ratio (equivalence ratio) of the dedicated EGR cylinder(s) is desired.

If a change in air-fuel ratio is desired, in Step 45, control unit 350 generates appropriate control signals to adjust the air-fuel ratio of the dedicated EGR cylinder(s). This leads to a change in the H2 and CO in the EGR gas and to improved combustion in the main cylinders.

As indicated in FIG. 4, this process of adjusting the EGR ratio to the main cylinders and the air-fuel ratio of the dedicated EGR cylinders is performed on a continuous basis while the engine is in operation.

Referring again to FIGS. 1, 2, and 3, because the dedicated EGR cylinder(s) may operate with EGR rates lower than that of the main cylinders or with no EGR at all, there is a potential for the dedicated EGR cylinder(s) to knock. However, it may be possible to operate the dedicated EGR cylinder(s) at high enough equivalence ratios to avoid knock. It is also possible to incorporate an independent charge air cooler in the intake system that feeds the D-EGR cylinder(s). For example, in the system of FIG. 3, a charge air cooler could be installed along intake line 380 downstream of valve 382 to help avoid knock.

Alternative Embodiments; Dedicated EGR Cylinders with Dual Intake Paths

Figure 5:
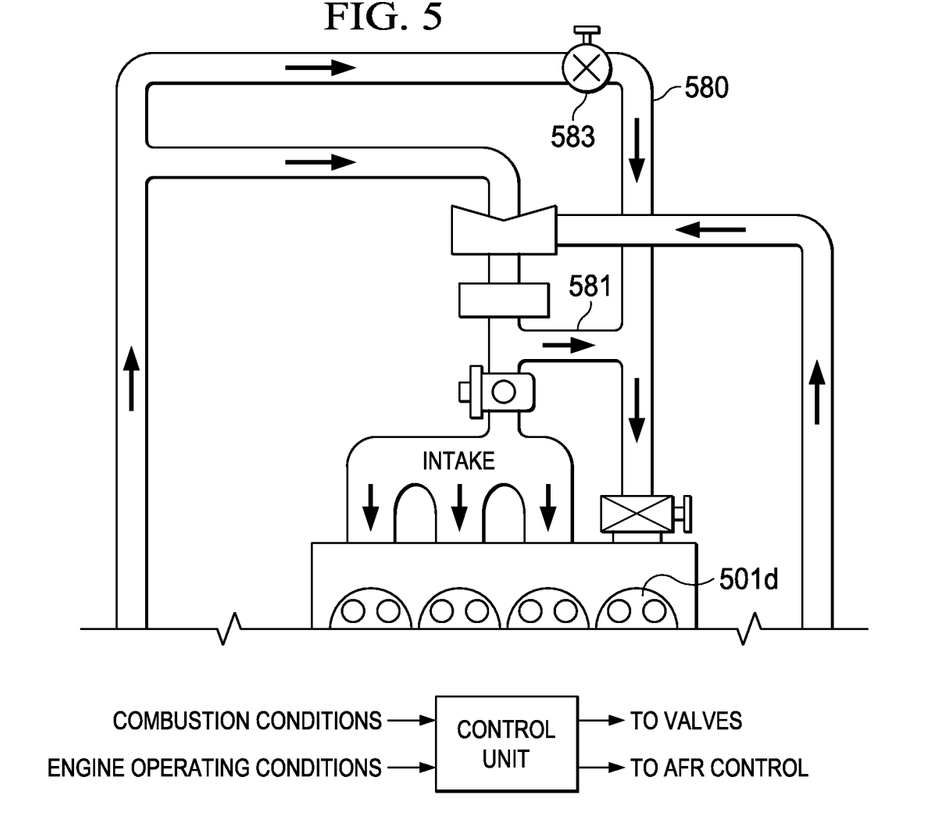
FIG. 5 illustrates an alternative embodiment of the intake paths of FIG. 3.

FIG. 5 illustrates an alternative embodiment of the intake paths of FIG. 3. A valve 583 is provided on the fresh air line 580, but there is no valve 582 in passage 581. However, even with only valve 583, it is possible to vary the EGR rates. With valve 583 wide open, the dedicated EGR cylinder 501d draws some fresh air from intake line 580 and some dilute air/EGR from passage 581. In the absence of a valve on the passage 581, the EGR flow to the dedicated EGR cylinder is not turned off, so a full 33% to the main cylinders could not be achieved. With valve 383 closed, the EGR rate to all cylinders would be 25%. Thus, in this embodiment, the EGR rate may be varied between 25% and 28-30% EGR.

Figure 6:
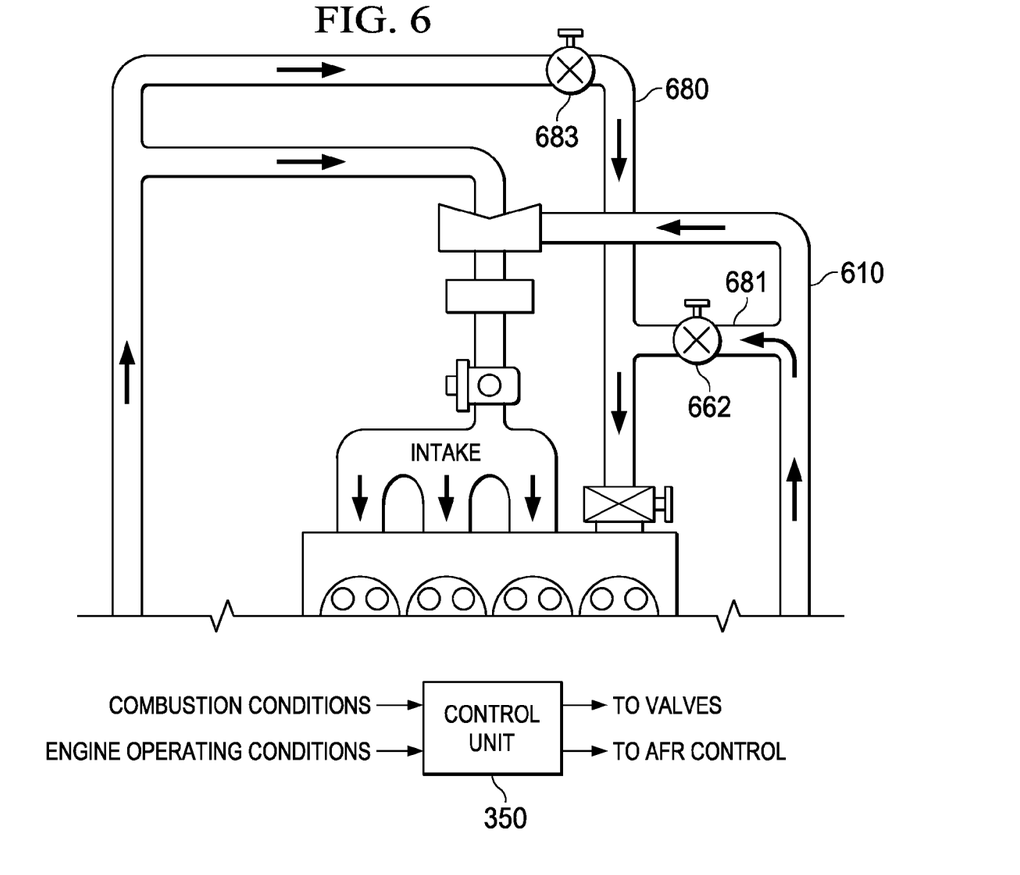
FIG. 6 illustrates another alternative embodiment of the intake paths of FIG. 3.

FIG. 6. illustrates an embodiment in which, instead of the passage 381 of FIG. 3, there is a passage 681 from the EGR loop 610 to the fresh air intake 680. In the embodiment of FIG. 3, passing EGR through a mixer ensures that the fresh air and EGR are homogeneous, which is important when the mixture of fresh air and EGR go into the main cylinders because each cylinder should receive the same amount of EGR. But that is less important if the EGR is only feeding the dedicated EGR cylinder via passage 681.

The method of FIG. 4 may be applied to the embodiments of FIGS. 5 and 6. In the case of FIG. 5, adjustments to the EGR rates are achieved with valve 383 with a smaller range of adjustment.

What is claimed is:

1. A method of using exhaust gas recirculation (EGR) to improve combustion efficiency of an internal combustion engine having a number of cylinders, comprising:
    operating one or more of the cylinders as dedicated EGR cylinder(s), such that all of its exhaust, during all or some engine cycles, may be recirculated via an EGR loop as EGR gas;
    operating all non dedicated EGR cylinder(s) as main cylinders that receive a mixture of fresh air and EGR gas via a mixed intake line and an intake manifold common to only the main cylinders;
    wherein the dedicated EGR cylinder(s) are configured to receive only fresh air via a fresh air intake line separate from the intake manifold to the dedicated EGR cylinder(s);
    wherein if the dedicated EGR cylinder(s) receive only fresh air, the main cylinder(s) receive EGR at a first EGR rate;
    wherein if the dedicated EGR cylinder(s) receive only the portion of EGR gas and fresh air, the main cylinder(s) receive EGR at a second EGR rate; and
    adjusting the rate of EGR gas received by the main cylinder(s) to the first EGR rate or to the second EGR rate in response to operating conditions of the engine.

2. The method of claim 1, wherein the dedicated EGR cylinder(s) has a single exhaust port that may open to the EGR loop.

3. The method of claim 1, wherein the dedicated EGR cylinder(s) has dual exhaust ports, one of which may open to the EGR loop and the other of which may open to the engine's main exhaust line.

4. The method of claim 1, wherein the engine's non dedicated EGR cylinder(s) are run stoichiometrically.

5. The method of claim 1, wherein the engine's non dedicated EGR cylinder(s) are run rich.

6. The method of claim 1, wherein the engine's non dedicated EGR cylinder(s) are run lean.

7. The method of claim 1, wherein the portion of EGR gas and fresh air is delivered to the dedicated EGR cylinder(s) via a passage downstream of a mixer in the intake to the main cylinders.

8. The method of claim 1, wherein the portion of EGR gas and fresh air is delivered to the dedicated EGR cylinder(s) via a passage from the EGR loop to the separate fresh air intake.

9. The method of claim 1, further comprising adjusting the EGR rate to the main cylinders to a rate between the first EGR rate and the second EGR rate.

10. The method of claim 9, wherein the adjusting is performed by adjusting the relative amount of fresh air and portion of the mixture of fresh air and EGR received by the dedicated EGR cylinder(s).

11. An exhaust gas recirculation (EGR) system for improved combustion efficiency of an internal combustion engine having a number of cylinders, comprising:
    one or more cylinders operable as dedicated EGR cylinder(s), such that all of its exhaust, during all or some engine cycles, may be recirculated via an EGR loop;
    one or more cylinders operable as main cylinders that receive EGR via the EGR loop;
    wherein the EGR loop is operable to recirculate EGR from the dedicated EGR cylinder(s) to an intake manifold of the main cylinders;
    a mixed input line for delivering a mixture of fresh air and EGR gas to the intake manifold of the main cylinders;
    a fresh air input line to the dedicated EGR cylinder(s);
    a passage between the mixed input line and the fresh air input line to the dedicated EGR cylinder(s), operable to deliver a portion of the mixture of fresh air and EGR to the dedicated EGR cylinder(s);
    wherein the dedicated EGR cylinder(s) may receive an intake comprising all fresh air or all the portion of the mixture or some proportion of both;
    a control unit programmed to perform the following tasks: receive data representing engine operating conditions, determine a desired EGR rate of EGR to be delivered to the main cylinders, and based on the desired EGR air, to control whether the dedicated EGR cylinder(s) receive all fresh air or all the mixture or some proportion of both.

12. The system of claim 11, wherein the dedicated EGR cylinder(s) has a single exhaust port that may open to the EGR loop.

13. The system of claim 11, wherein the dedicated EGR cylinder(s) has dual exhaust ports, one of which may open to the EGR loop and the other of which may open to an exhaust manifold of the main cylinders.

14. The system of claim 11, wherein the engine's non dedicated EGR cylinder(s) are run stoichiometrically.

15. The system of claim 11, wherein the engine's non dedicated EGR cylinder(s) are run lean.

16. The system of claim 11, wherein the engine's non dedicated EGR cylinder(s) are run rich.

17. The system of claim 11, further comprising a first valve on the passage line and a second valve on the fresh air line.

18. The system of claim 17, wherein the control unit is further programmed to control the first valve and the second valve such that the dedicated EGR cylinder(s) may receive proportions of fresh air and the mixture, and to adjust the proportions based on engine operating conditions.

* * * * *